US010991029B2

(12) United States Patent
Jain et al.

(10) Patent No.: US 10,991,029 B2
(45) Date of Patent: Apr. 27, 2021

(54) BACKGROUND CONTENT SUGGESTION FOR COMBINATION WITH IDENTIFIED ITEMS

(71) Applicant: Adobe Inc., San Jose, CA (US)

(72) Inventors: Ajay Jain, Ghaziabad (IN); Jonathan Stephen Roeder, Round Rock, TX (US); Ryan Timothy Rozich, Austin, TX (US); Sachin Soni, New Delhi (IN); Sanjeev Tagra, Panipat (IN)

(73) Assignee: Adobe Inc., San Jose, CA (US)

(*) Notice: Subject to any disclaimer, the term of this patent is extended or adjusted under 35 U.S.C. 154(b) by 195 days.

(21) Appl. No.: 16/295,746

(22) Filed: Mar. 7, 2019

(65) Prior Publication Data

US 2020/0286151 A1 Sep. 10, 2020

(51) Int. Cl.
*G06Q 30/00* (2012.01)
*G06Q 30/06* (2012.01)
*H04N 21/81* (2011.01)

(52) U.S. Cl.
CPC ..... *G06Q 30/0631* (2013.01); *G06Q 30/0633* (2013.01); *G06Q 30/0643* (2013.01); *H04N 21/8153* (2013.01)

(58) Field of Classification Search
CPC .................................................. G06Q 30/00
See application file for complete search history.

(56) References Cited

U.S. PATENT DOCUMENTS

| | | | | |
|---|---|---|---|---|
| 10,095,754 | B1* | 10/2018 | DiBenedetto | G06Q 30/0643 |
| 10,109,051 | B1* | 10/2018 | Natesh | G06K 9/4652 |
| 2015/0235389 | A1* | 8/2015 | Miller | G06Q 30/0627 |
| | | | | 345/594 |
| 2019/0378204 | A1* | 12/2019 | Ayush | G06Q 30/0643 |

OTHER PUBLICATIONS

Superimpose app1, "The top 14 apps to edit your instagram photos and vidios like a pro", quicksprout.com, dated Feb. 14, 2018. (Year: 2018).*
Superimpose app2, Wertens, Leilani, "Top 25 photo Editing Apps for Marketeters", upcityblog.com, dated May 15, 2018 (Year: 2018).*
Algolia Blog, "How we tackled Color Identification", algolia.com, dated Jul. 25, 2016. (Year: 2016).*

(Continued)

*Primary Examiner* — Mark A Fadok
(74) *Attorney, Agent, or Firm* — FIG. 1 Patents

(57) ABSTRACT

Background content suggestion for combination with identified items is described. Initially, a system receives digital visual content depicting an item, e.g., a product for purchase. The system identifies various content items that are available for suggesting as replacement backgrounds for the item and then determines a compatibility of these identified content items with the item depicted in the received digital visual content. In particular, the system determines compatibility based on both a scene compatibility and a color compatibility of the identified content items with the depicted item. Based on a combination of the scene and color compatibility, the system surfaces at least one of the identified content items (e.g., a highest scoring content item) as a suggested replacement background for the depicted item.

20 Claims, 10 Drawing Sheets

(56) References Cited

OTHER PUBLICATIONS

"Why are most product image backgrounds in ecommerce white", Retrieved at: https://ux.stackexchange.com/questions/104925/why-are-most-product-image-backgrounds-in-ecommerce-white—on Dec. 17, 2018, Feb. 14, 2017, 7 pages.

Kragelund, "White Backgrounds Be Gone: How Brands Add Color and Creativity to Product Photography", Retrieved at: https://www.bigcommerce.com/blog/reconsidering-white-background-product-photography/#undefined—on Dec. 17, 2018, 14 pages.

Munni, "What Color Background Should Your Ecommerce Site Have?", Retrieved at: https://clippingpathindia.com/blogs/tips/color-background-ecommerce-site, Feb. 7, 2018, 10 pages.

\* cited by examiner

BACKGROUND CONTENT SUGGESTION FOR COMBINATION WITH IDENTIFIED ITEMS

BACKGROUND

Advances in computing technology provide increasing accessibility to functionality that enables items (e.g., products, services, digital media, and so on) to be surfaced to multitudes of users via a listing platform. Examples of listing platforms include e-commerce platforms which surface listed products and services for purchase by client device users that navigate to these platforms. Other examples of listing platforms include rental platforms that list various items for rent (e.g., real estate, equipment, tools, vehicles, and contract employees), media platforms that list various digital content items for use (e.g., download or further propagation from the platform), and so forth. The functionality of these systems often includes provision of interfaces that enable digital visual content, indicative of an item to be listed, to be uploaded to the platform and surfaced with the respective listing.

By making this functionality easily accessible to a wide range of users, however, conventionally-configured listing platform systems often receive and thus expose digital visual content that is not optimized for conversion. By way of example, many digital images received by these listing platform systems depict a product to be listed on a white or transparent background. However, such backgrounds may not be effective to cause optimal conversion of the depicted product. This reliance on human users, to select and upload digital visual content for inclusion with listings, results in propagation by conventional listing platform systems of listings that fail to optimize conversion. Consequently, the performance of these conventional systems may be more closely tied to human judgement, e.g., to upload suitable digital visual content for listings, than to the actual capabilities of the system.

SUMMARY

To overcome these problems, background content suggestion for combination with identified items is leveraged in a digital medium environment. Initially, digital visual content depicting an item (e.g., a product for purchase) is received, such as by a listing platform system capable of surfacing a listing of the item to users of the platform. The system identifies various content items that are available for suggesting as replacement backgrounds for the item, such as stock content items that are made available for use by a stock content system. The system then determines a compatibility of these identified content items with the item depicted in the received digital visual content.

In particular, the system determines compatibility based on both a scene compatibility and a color compatibility of the identified content items with the item depicted in the digital visual content. To determine scene compatibility, the system computes scene compatibility scores based, at least in part, on text tags describing visual characteristics of the identified content items and also on text tags describing the visual characteristics of the item depicted in the digital visual content. To determine the color compatibility, the system computes color compatibility scores by determining a first set of dominant colors for each of the identified content items and determining a second set of the dominant colors for a modified version of the each of the identified content items, where the modified version is modified to include the item from the digital visual content. Once these scores are computed, the system combines them into a combined compatibility score. Based on the combined compatibility scores, the system then surfaces at least one of the identified content items (e.g., a highest scoring content item) as a suggested replacement background for the item depicted in the digital visual content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
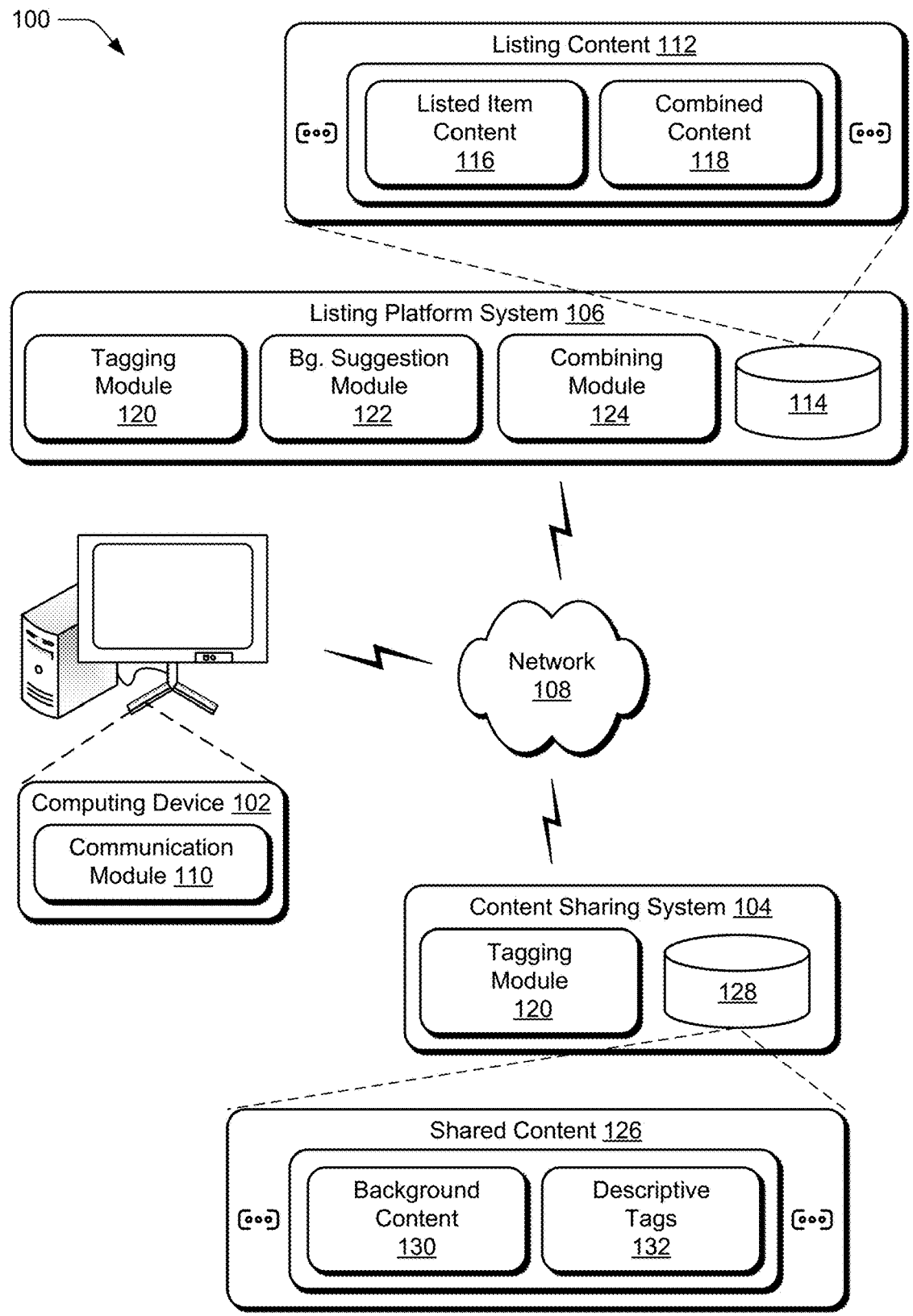
FIG. 1 is an illustration of an environment in an example implementation that is operable to employ techniques described herein.

Advances in computing technology provide increasing accessibility to functionality that enables items (e.g., products, services, digital media, and so on) to be surfaced to multitudes of users via a listing platform. This functionality often includes provision of interfaces that enable digital visual content, indicative of an item to be listed, to be uploaded to the platform and surfaced with the respective listing. By making this functionality easily accessible to a wide range of users, however, conventionally-configured listing platform systems often receive and thus expose digital visual content that is not optimized for conversion. This reliance on human users, to select and upload digital visual content for inclusion with listings, results in propagation by conventional listing platform systems of listings that fail to optimize conversion. Consequently, the performance of these conventional systems may be more closely tied to human judgement, e.g., to upload suitable digital visual content for listings, than to the actual capabilities of the system.

To overcome these problems, background content suggestion for combination with identified items is leveraged in a digital medium environment. Initially, digital visual content depicting an item (e.g., a product for purchase) is received, such as by a listing platform system capable of surfacing a listing of the item to users of the platform. In accordance with the described techniques, the listing platform system includes functionality to surface, to users of the system and via an interface of the platform, suggestions for replacing the background of their uploaded listing content. In particular, these suggested content items are configured to be modified by the system to include imagery of the items extracted from the uploaded content, such that new content depicting an item with a suggested background is configured to optimize conversion of a respective listing.

To determine which content items to suggest as replacement backgrounds, the listing platform system initially identifies various content items that are available for suggesting as the replacement backgrounds. In one or more implementations, these content items are made available by a content sharing service, such as a stock content system that makes stock content available, e.g., in accordance with the terms of a license agreement. In such cases, the listing platform system may thus identify the various content items available for suggesting as replacement backgrounds from a content repository of the content sharing service. In accordance with the described techniques, these available content items each include, or are otherwise associated with, a list of tags (e.g., a set of text strings) which describe visual characteristic of the respective content item. The listing platform system uses these text strings along with identified colors to determine a compatibility of the identified images with the item depicted in the received digital visual content.

As discussed above and below, the listing platform system determines the compatibility as a function of both scene compatibility and color compatibility of the identified content items with the item depicted in the digital visual content. To determine scene compatibility, for instance, the listing platform system computes scene compatibility scores for the identified content items. Each of these scene compatibility scores is based, at least in part, on text tags describing visual characteristics of a respective content item and also on text tags describing the visual characteristics of the depicted item. By way of example, the scene compatibility score may be based, in part, on identifying coexistences of these tags across all the lists of tags of analyzed content items.

To determine color compatibility, the listing platform system computes color compatibility scores for the identified content items. Each of these color compatibility scores is based on color themes of the identified content items and color themes of modified versions of the identified content items, which are modified to include the depicted item. In one or more implementations, for instance, the listing platform system determines a first and second set of dominant colors in relation to a given content item. The listing platform system determines the first set by identifying the dominant colors of the given content item. The listing platform system determines the second set by modifying the given content item to include the depicted item and identifying the dominant colors of the modified version of the given content item. In such implementations, the listing platform system then determines a difference between the first and second sets of colors. Broadly speaking, a lesser difference between the sets of dominant colors corresponds to a higher color compatibility score and thus reflects a more suitable color compatibility of the given content item with the depicted item than content items having a greater difference between the sets of dominant colors.

Once the scene and color compatibility scores are computed, the listing platform system combines them to generate combined compatibility scores for the identified content items. As discussed below, the listing platform system may generate the combined compatibility scores as a function of the scene and color compatibility scores, which applies weights to these scores to affect an influence of scene and color compatibility in suggesting replacement backgrounds for a depicted item. The listing platform system surfaces at least one of the identified content items (e.g., a highest scoring content item) as a suggested replacement background for the item depicted in the digital visual content based on the combined compatibility scores. By way of example, the listing platform system may surface simply the suggested content item via a user interface. In this scenario, the listing platform system may also expose functionality (e.g., via a user interface instrumentality) that allows a user of the listing platform to select to combine the depicted item with the suggested content item. Responsive to such a user selection, the listing platform system may combine the depicted item with the suggested content item, such as by extracting the depicted item from its respective digital visual content—using object recognition and image segmentation techniques—and by incorporating the item into the suggested background content. Alternately or in addition, the listing platform system may surface combined digital content in which the item is already incorporated with the suggested background content. In this scenario, the listing platform system may expose functionality that allows a user to accept or reject the combination.

By suggesting replacement background content for combination with items depicted in uploaded listing content, the described listing platform system reduces the reliance on human users to select and upload digital visual content for inclusion with listings that optimizes conversion of those listings. The listing platform system largely removes this burden from users. Consequently, the described listing platform system propagates content as part of listings that is generated to optimize their conversion. In this way, performance of the listing system platform is tied to its actual capabilities rather than reliance on human judgement.

Additional advantages of the described system include removing a burden from users to search through shared content to guess which content items may serve as better backgrounds for their listed items. By automatically combining a depicted item with a suggested background, the described system also does not require users to have knowledge about digital content editing, specifically, knowledge about how to extract a depicted item from one content item and incorporate the extracted item into another content item, e.g., a background image. The described system also provides the advantage that it does not require users to conduct additional photoshoots to capture images of their products against backgrounds that will improve conversion.

Term Descriptions

As used herein, the term "content item" refers to an instance of persistent digital content capable of being output via one or more interfaces of a computing device, such as via a display device, speakers, haptic hardware, and so forth. By way of example, content items include digital images, videos, documents, audio files, graphics, and so forth.

The term "digital visual content," specifically, refers to types of content items that can be output via display devices. For instance, images, videos, augmented- and virtual-reality content (AR/VR content) are examples of digital visual content.

As used herein, the term "item," when used as "depicted item," "listed item," "item depicted in digital visual content," "item depicted in listing content," and so forth, refers to an object or a representation depicted in digital visual content. An example of such items include objects, which may be recognizable using object recognition techniques. Physical products listed for sale and properties listed for rent or sale are examples of objects. Another example of such items include representations, which may be computer-generated graphics (e.g., e-book covers, album covers, digital representations of pieces of art) serving as objects in digital visual content.

As used herein, the term "listing" refers to digital content exposed to users of a platform and that allows the users to take some action in relation to one or more items listed via the listing. Examples of such actions include to purchase the one or more items, rent the one or more items, download the one or more items, further propagate the one or more items, and so forth. Indeed, users may take a variety of actions in relation to listed items without departing from the spirit or scope of the techniques described herein.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ background content suggestion for combination with identified items as described herein. The illustrated environment 100 includes computing device 102, content sharing system 104, and listing platform system 106 that are communicatively coupled, one to another, via a network 108. It is to be appreciated that although the content sharing system 104 is illustrated as separate from the listing platform system 106, the content sharing system 104 and the listing platform system 106 may additionally or alternately be included as part of a common service provider system without departing from the spirit or scope of the described techniques.

Computing devices that are usable to implement the computing device 102, the content sharing system 104, and the listing platform system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 9.

The computing device 102 is illustrated with a communication module 110, which represents functionality of the computing device 102 to communicate information to other devices such as service provider systems. In relation to the illustrated environment 100, the communication module 110 represents functionality of the computing device 102 to send information to and receive information from the content sharing system 104 and the listing platform system 106. The communication module 110, for instance, can communicate content data (e.g., digital images, digital videos, digital audio, augmented reality and virtual reality (AR/VR) content, and so forth) to the listing platform system 106. The communication module 110 can also communicate at least some listing content 112 to the listing platform system 106, such as images or videos of items to be listed, e.g., for purchase, rental, download, inspiration, propagation, and so forth.

The listing content 112 is illustrated in storage 114 and includes listed item content 116 and combined content 118. The listed item content 116 represents digital content maintained by the listing platform system 106 for use to list items via the listing platform system 106. By way of example, the listed item content 116 may include digital images or videos of items to be listed via the listing platform system 106. In accordance with the described techniques, the combined content 118 represents digital content that is generated by combining different items of content, such as a portion of an image of the listed item content 116 (e.g., a portion depicting an item to be listed) with a portion of an image from the content sharing system 104 (e.g., at least a portion of a scene to serve as a background for the item to be listed). The combined content 118 may include combinations of other types of content without departing from the spirit or scope of the described techniques, such as combinations of videos, combinations of images with videos, and so forth.

The listing platform system 106 is further illustrated with tagging module 120, background suggestion module 122, and combining module 124, which represent functionality to suggest background content for combining with the listed item content 116 and also functionality to combine the suggested content with the listed item content 116. By way of example, these modules represent functionality to suggest background content for combining with a content item that depicts a product to be listed via the listing platform system 106, such as to generate a new image of the product on the suggested background content which is more visually appealing than the content item and thus results in higher conversion than the content item.

In the illustrated environment 100, the content sharing system 104 also includes the tagging module 120. It is to be appreciated that the content sharing system 104 and the listing platform system 106 may both include or otherwise have access to the functionality of the tagging module 120. In one or more implementations, for instance, the listing platform system 106 may not include the tagging module 120 and instead simply access the functionality of the content sharing system 104's tagging module 120 over the network 108. Additionally or alternately, neither the content sharing system 104 nor the listing platform system 106 may include the tagging module 120, and instead may access its functionality over the network from a service provider system providing the functionality of the tagging module 120.

Regardless, the tagging module 120 represents functionality to process digital visual content, such as images and videos, identify characteristics of the digital visual content, and generate a list of text tags that describe the digital visual content. In accordance with the described techniques, these digital content characteristics include recognized items, such as items recognized using object recognition techniques. These digital content characteristics also include recognized environments, such as 'kitchen,' 'living room,' 'office,' 'forest,' 'desert,' 'mountains,' 'desk space,' 'counter space,' and so on. These digital content characteristics can also include colors, angles at which the depicted content is captured (e.g., 'top view,' 'side view,' etc.), themes (e.g., 'minimalistic,' 'luxury,' 'contemporary,' 'simple,' etc.), descriptions of the environment (e.g., 'empty'), and so forth. It is to be appreciated that the tagging module 120 is configured to identify and generate lists of tags for a variety of characteristics of digital content without departing from the spirit or scope of the techniques described herein.

The content sharing system 104 leverages the functionality of the tagging module 120 to tag shared content 126, which is illustrated as being stored in storage 128 of the content sharing system 104. Broadly speaking, the content sharing system 104 represents functionality to "share" the shared content 126 over the network 108. In one or more implementations, for instance, the content sharing system 104 corresponds to a stock content service provider that provides the shared content 126 as stock content over the network to users of the service. In cases where the content sharing system 104 corresponds to a stock content service provider, the content sharing system 104 may share the shared content 126 in accordance with terms of a license, such as in exchange for a fee (e.g., a subscription fee, a per-content-item fee, etc.), with limits regarding how the content is used by the user, and so forth. By way of example, the content sharing system 104 may share content items of the shared content 126 with users of the listing platform system 106, such as a user of the computing device 102 accessing functionality of the listing platform system 106.

In accordance with the described techniques, the content sharing system 104 may be configured to share (e.g., in accordance with licensing agreements) a variety of different types of the shared content 126, including images, videos, audio (e.g., sound effects, stock music, etc.), graphics (e.g., vector graphics), fonts, three-dimensional (3D) models, 3D environments, augmented- and virtual-reality (AR/VR) content, and so forth. Indeed, the shared content 126 may correspond to a variety of digital content without departing from the spirit or scope of the techniques described herein.

In the context of suggesting backgrounds for listed items, the shared content 126 is depicted including background content 130 and descriptive tags 132. The shared content 126 is depicted with ellipses to indicate that it may include the various other content in one or more implementations. The background content 130 represents digital visual content (e.g., images, videos, AR/VR content, etc.) that is capable of serving as a visual background for an item depicted in the listed item content 116. Using the functionality of the tagging module 120, the content sharing system 104 processes the background content to identify various characteristics, such as those noted above. Based on this identification, the tagging module 120 generates the descriptive tags 132 for the background content 130. For each content item of the background content 130, for instance, the tagging module 120 generates a respective list of the descriptive tags 132 that describe the characteristics identified by the tagging module 120. In relation to one example image of a kitchen (not shown), the tagging module 120 may generate and associate with the image (e.g., by adding to metadata or configuring with a link) a list of the descriptive tags 132, such as "white, kitchen, minimalistic, interior, modern, design, furniture, cabinet, shelf, contemporary, clean, elegant, wood, bright, luxury, sing, oven, empty, comfortable, exclusive, simple, appliance." In this way, each content item of the background content 130 may be associated with a respective list of the descriptive tags 132 generated by the tagging module 120.

Using the tagging module 120's functionality, the listing platform system 106 is also able to generate a list of tags to describe visual characteristics of the listed item content 116. As discussed in further detail below, the background suggestion module 122 uses tags describing the listed item content 116 along with the descriptive tags 132 to determine scene compatibility of the scenes depicted in the background content 130. In addition to determining a scene compatibility of the background content 130, the background suggestion module 122 determines color compatibility of the background content with the items depicted in the listed item content 116. The background suggestion module 122 is configured to determine which of the background content 130 to suggest based on the scene compatibility and the color compatibility, such that suggested content is compatible with a depicted item in terms of scene and color.

The combining module 124 represents functionality to combine the background content 130 suggested by the background suggestion module 122 with items depicted in the listed item content 116 to generate the combined content 118. Consider an example in which a content item of the listed item content 116 depicts only a knife on a white background and the background content 130 suggested by the background suggestion module 122 is an image depicting a kitchen cutting board. In this example, the combining module 124 is capable of extracting the knife from the listed item content 116 (e.g., its pixels corresponding to the knife) and adding the extracted knife to the image depicting the kitchen cutting board, e.g., generating a new image of the kitchen cutting board having the knife. This new image is an example of the combined content 118. The combined content 118 may then be surfaced by the listing platform system 106 as part of a listing, e.g., a listing for sale, rent, download, and so forth.

Having considered an example environment, consider now a discussion of some example details of the techniques for background content suggestion in a digital medium environment in accordance with one or more implementations.

Background Content Suggestion for Combination with Identified Items

Figure 2:
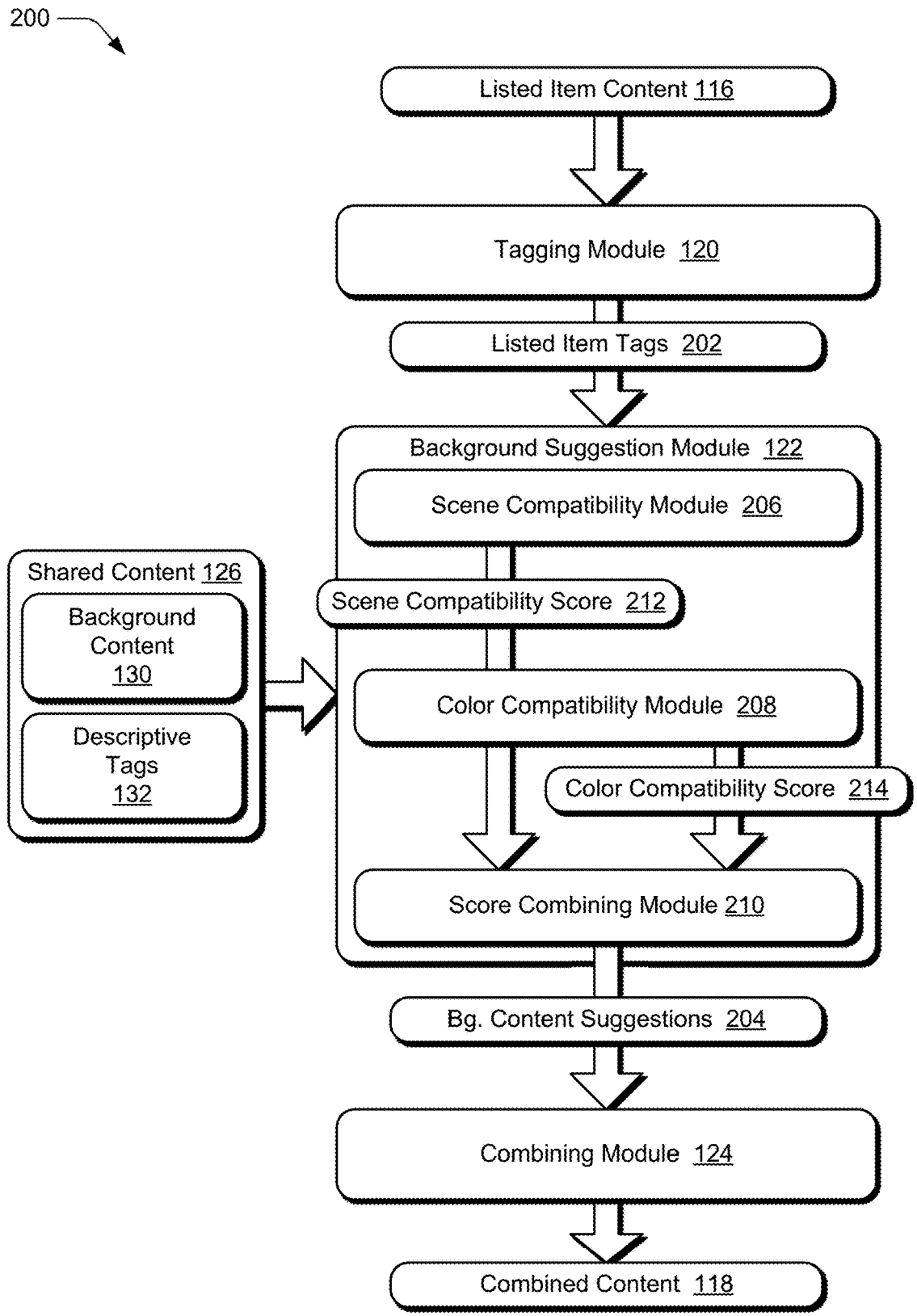
FIG. 2 depicts an example implementation in which the listing platform system of FIG. 1 generates suggestions of background content for combination with items identified in listing content.

FIG. 2 depicts an example implementation 200 in which a listing platform system generates suggestions of background content for combination with items identified in listing content. The illustrated example 200 includes from FIG. 1 the tagging module 120, the background suggestion module 122, and the combining module 124 and also includes the listed item content 116, the combined content 118, and the shared content 126 including the background content 130 and the corresponding descriptive tags 132.

In this example 200, the tagging module 120 is depicted obtaining the listed item content 116. The tagging module 120 identifies characteristics of the listed item content 116 (e.g., an image of a product for sale), determines tags that correspond to the identified characteristics, and generates one or more listed item tags 202. In one or more implementations, the listed item tags 202 are generated as a list of tags that can be included as part of (e.g., as metadata) or otherwise associated with a respective content item of the listed item content 116. In relation to an image that depicts a knife, for instance, the tagging module 120 can identify characteristics of a knife using object recognition, determine that the tag 'knife' corresponds to the identified characteristics, and then generate a list of tags for the image that includes the tag 'knife.'

In the illustrated example 200, the background suggestion module 122 is depicted receiving the listed item content 116 and the listed item tags 202 as input. The background suggestion module 122 is also depicted receiving the shared content 126, which includes the background content 130 and the descriptive tags 132 as input. In accordance with the described techniques, the background suggestion module 122 generates background content suggestions 204 based on the listed item content 116, the listed item tags 202, and the shared content 126.

As illustrated, the background suggestion module 122 includes scene compatibility module 206, color compatibility module 208, and score combining module 210. These modules represent functionality of the background suggestion module 122 to process the above-noted inputs and generate the background content suggestions 204 in accordance with the following discussion. It is to be appreciated, however, that the background suggestion module 122 may be implemented with more, fewer, or different modules to carry out the described functionality without departing from the spirit or scope of the techniques described herein.

The scene compatibility module 206 represents functionality to determine a compatibility of different content items of the background content 130 with listed items depicted in the listed item content 116. In accordance with the described techniques, the scene compatibility module 206 generates a scene compatibility score 212 for each content item of the background content 130 that is considered in relation to a given content item of the listed item content 116. For a particular image of a product being listed, for instance, the scene compatibility module 206 generates a scene compatibility score 212 for each image of the background content 130 that is a candidate for combination with the image of the product being listed. In this way, the scene compatibility score 212 allows each of these candidate background content 130 items to be compared, e.g., to identify images that have better scene compatibility with a product being listed than other images.

In one or more implementations, the scene compatibility module 206 computes the scene compatibility score 212 according to the following discussion. Initially, the scene compatibility module 206 generates a representation of a given item of the background content 130 based on a number of the descriptive tags 132 corresponding to the given content item, e.g., a number of tags in the list corresponding to the given content item. In the following discussion, the number of tags corresponding to a given item of background content 130 is represented by the term n. In at least one example, the scene compatibility module 206 may thus generate a representation of an image as a set of tags in accordance with the following:

ImageTagsSet=$\{T_1, T_2, T_3, \ldots T_n\}$

Here, the terms $T_1$, $T_2$, $T_3$, $T_n$ each represent different descriptive tags 132 identified for and associated with the given content item. As part of computing the scene compatibility score 212 for the given content item depicting the item being listed, the scene compatibility module 206 determines an association of each of the tags included in the set with the item to be listed. With reference to the above-noted example, for instance, the scene compatibility module 206 determines an association of the tag $T_1$ with the item to be listed, an association of the tag $T_2$ with the item to be listed, an association of the tag $T_3$ with the item to be listed, and so on, until determining an association of the tag $T_n$ with the item to be listed.

In one or more implementations, the scene compatibility module 206 determines an association with a given tag as a probability. Specifically, the probability is of the given tag and an item tag, representative of the item to be listed, to coexist in tag lists of a repository of content items, e.g., a probability of the two tags to coexist in the tag lists of all items of the available background content 130. The scene compatibility module 206 generates a list of the associations for each set of image tags. This generated list is represented below by the term ItemAssociationWithTags. In connection with the image tag set expressed above, for instance, the scene compatibility module 206 generates a list having a number of associations n corresponding to the number of tags in the ImageTagSet, where the list may be generated in one example as follows:

ItemAssocationWithTags=$\{A_1, A_2, A_3, \ldots A_n\}$

Here, the terms $A_1$, $A_2$, $A_3$, $A_n$ each represent an association (e.g., a probability) of the terms $T_1$, $T_2$, $T_3$, $T_n$, respectively, to coexist with the item tag of the item to be listed. In implementation, the scene compatibility module 206 may select the listed item tag 202 corresponding to the item to be listed as a tag describing the item itself or a tag describing a class of items to which the listed item belongs. For a knife, for instance, the scene compatibility module 206 may select the tag "paring knife" (e.g., as the item itself) or the tag "cutlery" or even "kitchen utensil" (e.g., as the class of the item). In one or more implementations, the scene compatibility module 206 determines the associations $A_1$, $A_2$, $A_3$, $A_n$ in accordance with the following:

$$A_1 = \frac{\text{\# of times } Itm \text{ and } T_1 \text{coexist}}{\text{\# of } Itm + \text{\# of } T_1}$$

Here, the term $A_1$ corresponds to the computed probability of the tag $T_1$ and the tag Itm, selected to represent the item to be listed, to coexist in lists of image tags of available content, e.g., coexist in lists of the descriptive tags 132 of the background content 130. The scene compatibility module 206 computes probabilities for the associations $A_2$, $A_3$, ... $A_n$ in a similar manner. The term # of times Itm and $T_1$ coexist represents the number of times that the tag $T_1$ and the tag Itm coexist in the lists of tags of the background content 130. Consider an example in which the tag Itm is 'knife' and the tag $T_1$ is 'kitchen,' for instance. In this example, the scene compatibility module 206 processes the lists of tags for the available background content 130. Each time the scene compatibility module 206 identifies both tags 'knife' and 'kitchen' in a list of tags describing a particular content item of the background content 130, the scene compatibility module 206 increments the term # of times Itm and $T_1$ coexist, e.g., starting at zero and adding one for each identified coexistence.

In contrast to that term, the terms # of Itm and # of $T_1$, represent the number of times the tag Itm and the tag $T_1$ exist, respectively, in the lists of tags of the background content. Thus, the term # of Itm is incremented not only when the tag Itm and the tag $T_1$ coexist in a list, but also when the tag Itm exists in a list but the tag $T_1$ is not included in that list. Similarly, the term # of $T_1$ is incremented not only when the tag Itm and the tag $T_1$ coexist in a list, but also when the tag $T_1$ exists in a list but the tag Itm is not included in that list.

Given a list of the associations for a given image, the scene compatibility module 206 computes the scene compatibility score 212 as a function of the determined associations. In one example, for instance, the scene compatibility module 206 computes the scene compatibility score 212, represented by the term SC, in accordance with the following:

$$SC = A_1 + A_2 + A_3 + \ldots A_n$$

Here, the scene compatibility module 206 computes the scene compatibility score 212 by simply adding the associations $A_1, A_2, A_3, \ldots A_n$. However, the scene compatibility module 206 may compute the scene compatibility score 212 in different ways without departing from the spirit or scope of the described techniques, such as by weighting associations for different types of terms (e.g., weighting terms indicative of angle, position, perspective differently than terms describing the scene or theme), adding a term to capture conversion rate of the background content 130 across listings for which it is used, and so forth.

In one or more implementations, the scene compatibility module 206 also incorporates performance measures of the background content 130 into the scene compatibility score 212, such that the scene compatibility score 212 can also reflect influence of this content to cause conversion of listed items, e.g., how well background content combined with the listed items causes conversion. In this way, the background content 130 that is observed causing higher conversion rates may be suggested to help with conversion of a listed item.

The scene compatibility module 206 may incorporate performance of the background content 130 into the scene compatibility score 212 in accordance with the following. Initially, the scene compatibility module 206 identifies items of digital visual content that are already used in listings which are "performing well." By "performing well" it is meant that the observed conversion (e.g., purchases initiated, clicks, etc.) or conversion rate in relation to actions involving the respective content satisfies one or more criteria indicative of suitable performance. Examples of these criteria include that the conversion or conversion rate observed in relation to a content item is above a conversion threshold, higher than the than those of related listings (e.g., listings in a same category), a top k conversion or conversion rate for background content (e.g., across all stock images, across stock images used in connection with particular categories of listings such as kitchen utensils versus furniture, etc.), and so forth. It is to be appreciated that different criteria indicative of suitable performance to be "performing well" may be used without departing from the spirit or s cope of the described techniques.

In order to incorporate content performance into the scene compatibility score 212, the scene compatibility module 206 generates a table based on the in-use content that is identified to be performing well. The scene compatibility module 206 generates this table to include category tags (e.g., in a first column), which correspond to a category of an item being listed with the well-performing content. This table is also generated to include background-characteristic tags (e.g., in a second column), which describe characteristics present in the well-performing content. The scene compatibility module 206 also determines weights for each of the background-characteristic tags and links these determined weights with the respective background-characteristic tags in the table.

In one or more implementations, the scene compatibility module 206 generates this table in accordance with the following discussion, namely, by performing the following procedure for each identified item of well-performing content. The scene compatibility module 206 modifies the well-performing content item by removing the listed item depicted therein, such as by using one or more content aware fill techniques. In connection with functionality of the content sharing system 104, the scene compatibility module 206 then identifies items of the shared content 126 (e.g., stock images) that are similar to this modified well-performing content. For each of the identified similar content items, the tagging module 120 generates a list of tags describing the respective content item.

The scene compatibility module 206 then processes each tag by initially determining whether the tag is already included in the table with the background-characteristic tags (e.g., in the table's second column) in association with the category tag of the item removed from the content item (e.g., in a row corresponding to this category). If a tag is not yet included in the table for the category, the scene compatibility module 206 adds the tag to the table (e.g., in the row corresponding to the category and the second column). For these newly added tags, the scene compatibility module 206 also sets a weight of the tag equal to one ("1"). If the tag is already included in the table for the category, however, the scene compatibility module 206 increments the weight of the tag by one ("1"). Thus the more often a particular tag is identified in the lists describing the similar images the greater the tag's weight for the category.

Using this table, the scene compatibility module 206 can further apply performance weights to the above discussed associations of background content tags, such as to apply more weight to associations computed for tags that are used frequently in content similar to the well-performing content. The scene compatibility module 206 can be trained not only to weight tags because they describe characteristics common to well-performing content items, but also to weight tags in a variety of other ways without departing from the spirit or scope of the described techniques.

For example, the scene compatibility module 206 may leverage machine learning techniques to determine weights to associate with the tags of a given item of the content. The scene compatibility module 206 can use any type of machine learning techniques capable of learning how the presence of different tags describing digital visual content correlates to suitability as a background for an item to be listed, e.g., to learn how the presence of a tag correlates to conversion of listings that use the background. According to various implementations, such techniques may use a machine-learning model trained using supervised learning, unsupervised learning, and/or reinforcement learning. For example, the machine-learning model can include, but is not limited to, auto encoders, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. The scene compatibility module 206 may use machine learning techniques to continually train and update the machine-learning model (or, in other words, to update a trained machine-learning model) to more accurately reflect the suitability of background content for combining with items to be listed and listed for different purposes, e.g., sale of an item, rent of an item, and so forth.

In contrast to the scene compatibility module 206, the color compatibility module 208 represents functionality to determine a color compatibility of different content items of the background content 130 with the listed items depicted in the listed item content 116. In accordance with the described techniques, the color compatibility module 208 generates a color compatibility score 214 for each of the content items of the background content 130 considered in relation to a given content item of the listed item content 116. For a particular image of a product being listed, for instance, the color compatibility module 208 generates the color compatibility score 214 for each image of the background content 130 that is a candidate for combination with the image of the product being listed. In this way, the color compatibility score 214 allows each of these candidate background content 130 items to be compared, e.g., to identify images that have better color compatibility with the product being listed than other images.

In one or more implementations, the color compatibility module 208 computes the color compatibility score 214 in accordance with the following discussion. The color compatibility module 208 determines a color theme of a respective content item of the background content 130. In one example, for instance, the color compatibility module 208 identifies from the respective content item a predetermined number of dominant colors, such as a top five dominant colors of the content item. For instance, the color theme CT( ) of the background image $I_{BG}$ may be expressed as a set of identified colors in accordance with the following:

$$CT(I_{BG}) = \{C_1, C_2, C_3, C_4, C_5\}$$

Here, the terms $C_1$, $C_2$, $C_3$, $C_4$, $C_5$ correspond to the top five dominant colors of the background image $I_{BG}$. The color compatibility module 208 may determine the dominant colors of background content in a variety of ways without departing from the spirit or scope of the described techniques. By way of example and not limitation, the color compatibility module 208 may determine a number of pixels that correspond to each color present in an image, such as number of white pixels, a number of black pixels, and so on. Given this, the color compatibility module 208 may identify the dominant colors as those corresponding to the largest number of pixels, e.g., top five.

In addition to identifying the dominant colors from the respective content item, the color compatibility module 208 also identifies the dominant colors of the respective content item with the listed item included in the respective content item, e.g., combined into the respective content item to depict the listed item as part of the respective content item. To this end, the color compatibility module 208 may identify the top five dominant colors of the combined image. In one example, the color theme CT( ) of the combined image $I_{BG+ITM}$ may be expressed as a set of identified colors in accordance with the following:

$$CT(I_{BG+ITM}) = \{C'_1, C'_2, C'_3, C'_4, C'_5\}$$

Here, the terms $C'_1$, $C'_2$, $C'_3$, $C'_4$, $C'_5$ correspond to the top five dominant colors of the combined image $I_{BG+ITM}$. The color compatibility module 208 then computes a difference D between the dominant colors of the background image and the dominant colors of the combined image. In one or more implementations, the color compatibility module 208 computes the difference D according to the following:

$$D = CT(I_{BG}) - CT(I_{BG+ITM}) = \{C_1, C_2, C_3, C_4, C_5\} - \{C'_1, C'_2, C'_3, C'_4, C'_5\}$$

Additionally, the color compatibility module 208 may compute the color compatibility score 214 as function of the difference. In the following, the color compatibility score 214 is represented by the term CC. In one example, the color compatibility module 208 computes the color compatibility score 214 as follows:

$$CC = \frac{k}{D}$$

Here, the term k represents a constant that is adjustable based on various factors, such as user input indicative of a tolerance for colors to match. With regard to the difference D, when the difference D is lower there is higher color compatibility between the given background content and the depiction of the item to be listed from the listed item content 116.

The score combining module 210 represents functionality to combine the scene compatibility score 212 and the color compatibility score 214 for each content item of the background content 130 and generate a combined score (not shown) for the respective content item. In one example, the score combining module 210 generates the combined score, CS, by combining the scene compatibility score 212, SC, and the color compatibility score 214, CC, in accordance with the following:

$$CS = a \times SC + b \times CC$$

Here, the terms a and b represent weights that the score combining module 210 is configured to adjust to control an effect of the scene compatibility score 212 and the color compatibility score 214, respectively, on the background content 130 suggested. The background suggestion module 122 can then compare the different items of the background content 130 based on this combined score. By way of example, the item of background content 130 with the highest combined score corresponds to the most compatible background for the item depicted in the listed item content 116. In other words, the items of background content 130 with higher combined scores are more compatible with the depicted item than items of background content 130 with lower combined scores. Further, the background suggestion module 122 selects the background content suggestions 204 from the background content 130 based on the combined scores.

Thus, the background content suggestions 204 may correspond to the item of background content 130 having the highest combined score. Alternately or additionally, the background content suggestions 204 may include the items of background content 130 having a top k scores, where k is a defined number greater than zero. In one or more implementations, a number of the background content suggestions 204 may be user selectable. Given this, the background suggestion module 122 may cause display of a user-selected number of the background content suggestions 204 via a user interface, such as via a user interface of the listing platform system 106. Absent user selection of a number of suggestions to display, the background suggestion module 122 may cause display of a default number of the background content selections 204.

As discussed above and below, the combining module 124 represents functionality to combine the item to be listed from the listed item content 116 with the background content suggestions 204. By combining the item to be listed with the background content suggestions 204, the combining module 124 forms the combined content 118. In one or more implementations, the combining module 124 extracts the depicted item to be listed from the listed item content 116, e.g., using one or more object recognition techniques, one or more object selection techniques, and one or more segmentation techniques. The combining module 124 then combines the extracted item to be listed by adding it to the background content suggestions 204, such as by adding a content layer, replacing pixels of the background content suggestions 204, and so forth. The combining module 124 may combine the item to be listed from the listed item content 116 with the background content suggestions 204 in a variety of ways without departing from the spirit or scope of the described techniques.

In the context of outputting suggestions of background content and combined content for approval of a user, consider the following discussion of FIGS. 3-6.

Figure 3:
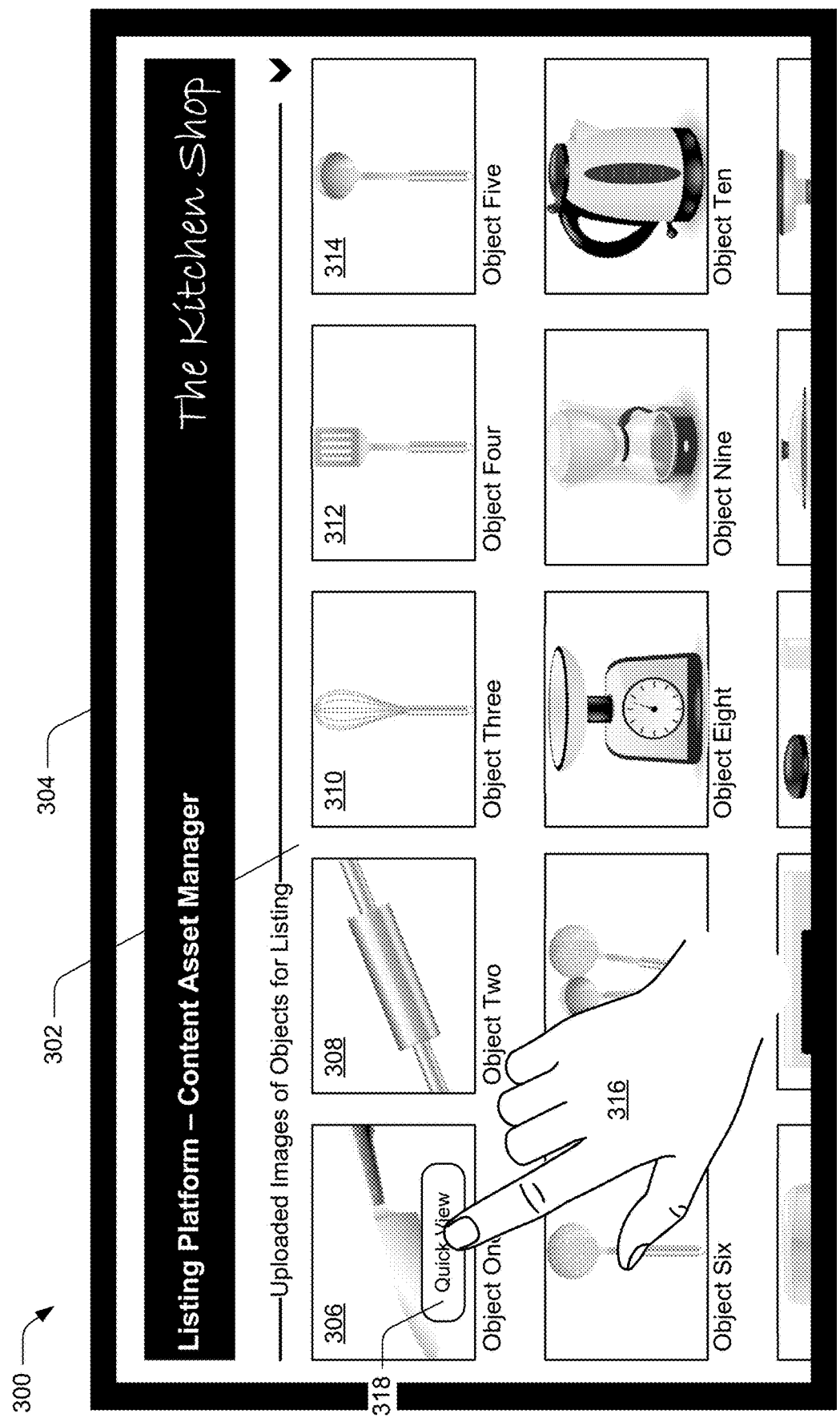
FIG. 3 depicts an example user interface via which content depicting items for listing is presented with instrumentalities to manage the content.

FIG. 3 depicts example 300 of a user interface via which content depicting items for listing is presented with instrumentalities to manage the content.

The illustrated example 300 includes user interface 302 displayed via display device 304. The display device 304 may be included as part of or communicably coupled to the computing device 102 in accordance with the described techniques. Here, the user interface 302 is associated with the listing platform system 106, e.g., to provide access to functionality provided by the listing platform system 106. The user interface 302, for instance, may correspond to a web-based application of the listing platform system 106, a web browser displaying a web page of the listing platform system 106, and so on. In this example 300, the user interface is depicted displaying listed-item images, including listed-item images 306, 308, 310, 312, 314. In the context of FIG. 1, these listed-item images correspond to examples of the listed item content 116.

This example 300 also includes a hand of a user 316, which is depicted selecting the listed-item image 306, e.g., based on touch input. The illustrated example 300 also includes selection instrumentality 318, which represents a visual indicia enabling selection of listing information associated with the listed-item image 306. The listing information may include the listed-item image 306 as well as other information about the item to be listed, such as a purchase price, rental price, licensing information, quantity, text description, and so forth. Responsive to such a selection, the listing platform system 106 may present one or more instrumentalities to access various functionality, such as to modify the listing information, surface a listing, remove a listed item, and so on. It should be appreciated that the ability to select an image may be indicated via the user interface 302 in ways other than visually through display of the selection instrumentality 318 without departing from the spirit or scope of the described techniques. The user 316 may provide a voice command received by a voice assistant device, for instance, to select the listing information associated with the listed item-image 306.

Figure 4:
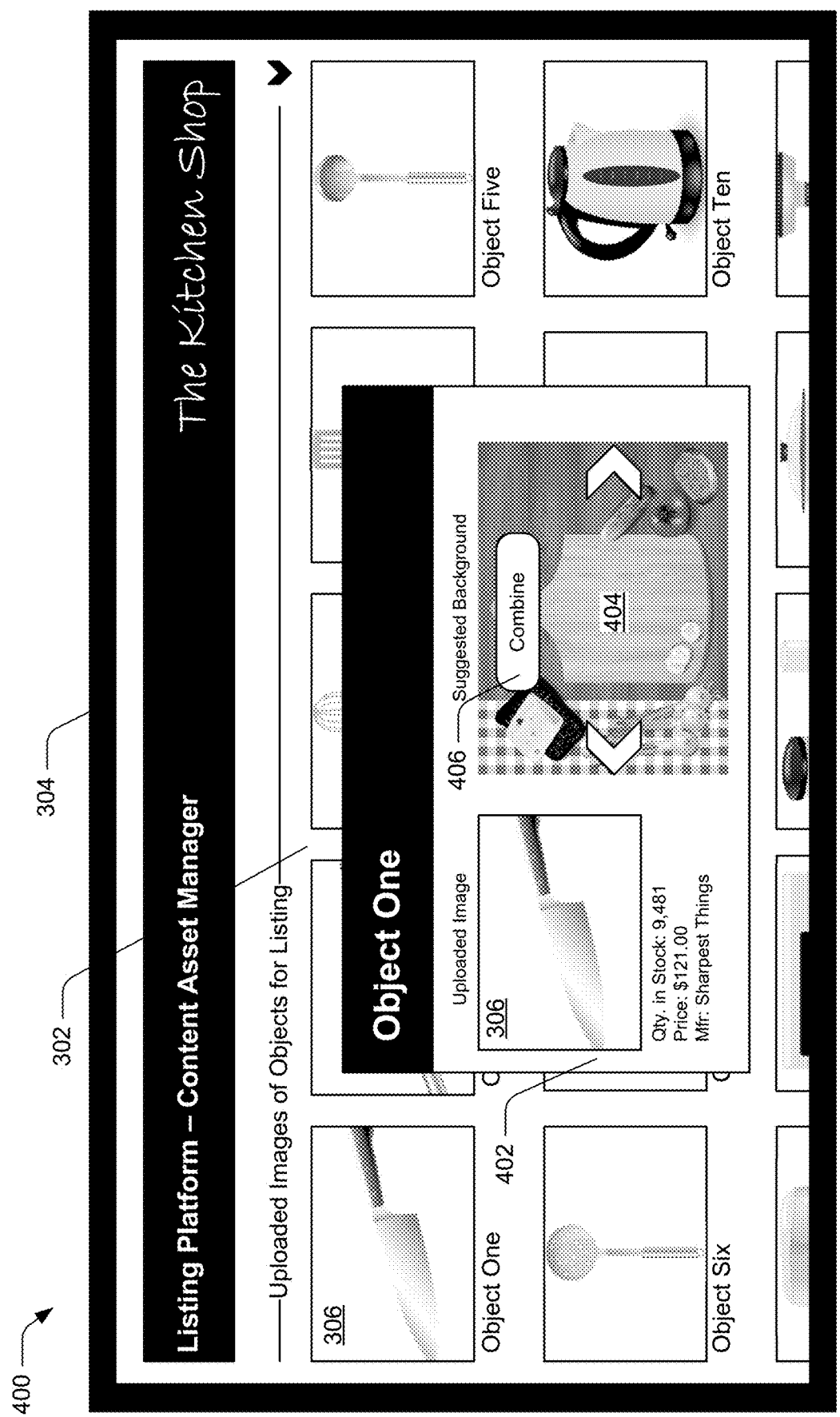
FIG. 4 depicts another example of the user interface in which background content is suggested for combination with content depicting an item for listing.

FIG. 4 depicts another example 400 of the user interface in which background content is suggested for combination with content depicting an item for listing.

In this example 400, the user interface 302 is depicted presenting listing information dialog 402, which presents information associated with an item for listing via the listing platform service 106. In particular, this information includes the listed-item image 306 and a suggested background image 404. The suggested background image 404 corresponds to an example of one of the background content suggestions 204. The illustrated example 400 also depicts arrows overlayed on the background image 404, which represent functionality to scroll through other suggested background images, e.g., other background content suggestions 204.

In this example, the listing information dialog 402 also includes combination instrumentality 406. The combination instrumentality 406 represents functionality to receive user input to combine the listed item from the listed-item image 306 with the suggested background image 404. In the context of identifying which of the background content 130 to suggest as the background content suggestions 204, e.g., to present as the background image 404, consider FIG. 5.

Figure 5:
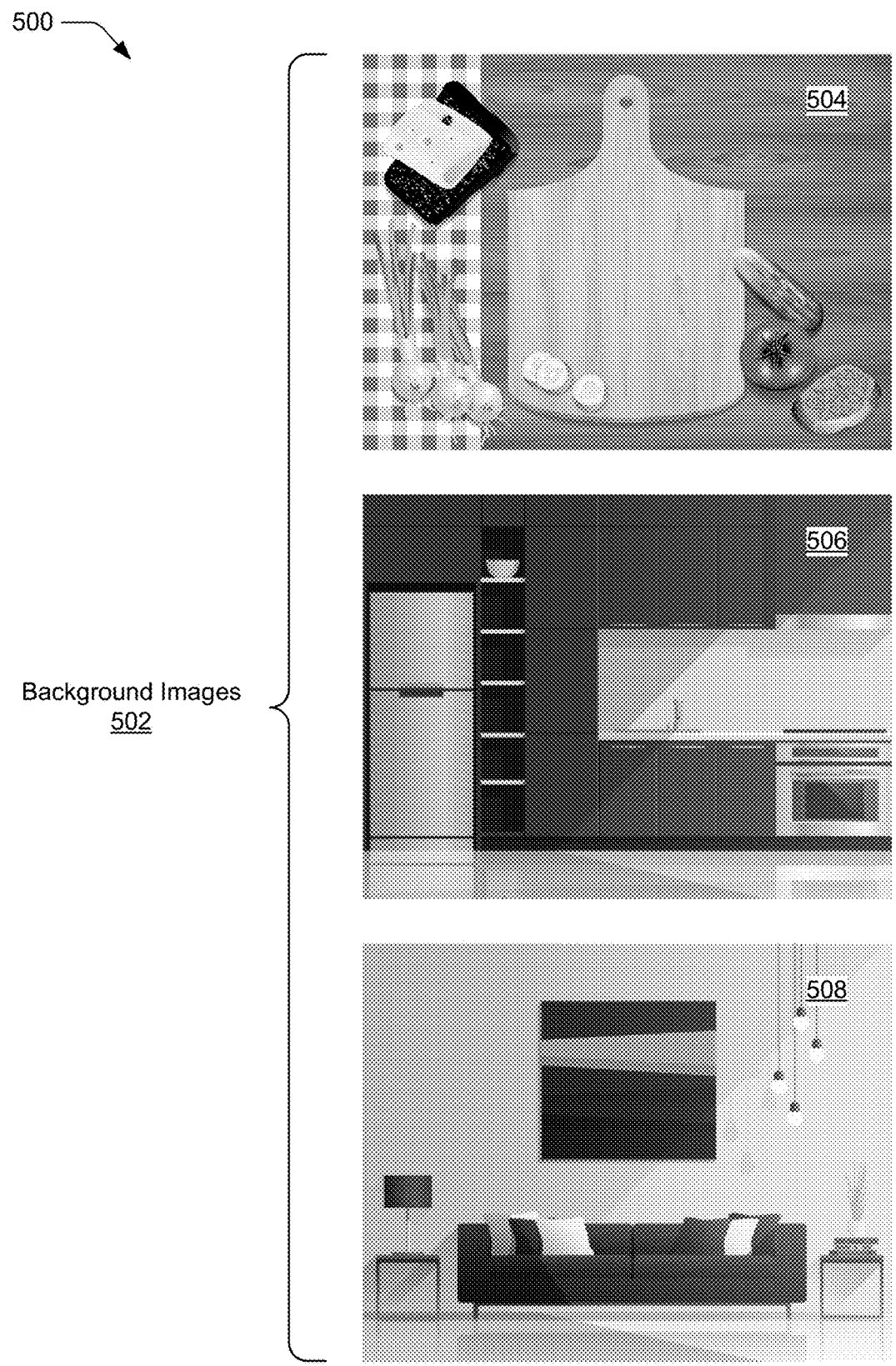
FIG. 5 depicts examples of different background images that may be maintained for sharing by the content sharing system of FIG. 1.

FIG. 5 depicts examples 500 of different background images that may be maintained for sharing by the content sharing system of FIG. 1.

The illustrated example 500 includes background images 502, which may correspond to three example images maintained by the content sharing system 104 as the background content 130. Specifically, these background images include top-view kitchen image 504, side-view kitchen image 506, and living room image 508.

Consider an example in which compatibility of these background images 502 is determined for combination with the listed-item image 306. In relation to the listed-item image 306, the living room image 508 may have a relatively low scene compatibility score 212. The scene compatibility module 206 may compute a relatively lower scene compatibility score 212 for the living room image 508 due, in part, to fewer coexisting tags between the listed-item image 306 and the living room image 508. The living room image 508 is unlikely to be tagged with tags such as 'kitchen' and 'cooking,' for instance. Although the top-view kitchen image 504 and the side-view kitchen image 506 may both have higher scene compatibility scores 212, the top-view kitchen image 504 may have a relatively higher scene compatibility score in relation to the listed-item image 306. The scene compatibility module 206 may compute a relatively higher score for the top-view kitchen image 504 due, in part, to coexistence of a tag indicative of a matching view, e.g., 'top down view.' The side-view of the side-view kitchen image 506 is unlikely to provide a suitable match with the listed-item image 306 because the depicted knife in the listed-item image 306 is depicted from a top down view. It is to be appreciated that these background images 502 are merely examples of images that may be considered for combination with an image of an item to be listed, and that the scene compatibility module 206 computes the scene compatibility score 212 as discussed in more detail above.

Regardless, among these three background images 502, the background suggestion module 122 may cause the top-view kitchen image 504 to be suggested for combination with the listed-item image 306, e.g. by presenting the top-view kitchen image 504 as the suggested background image 404. In the context of combining the suggested background image 404 with the listed-item image 306, consider the following discussion of FIG. 6.

Figure 6:
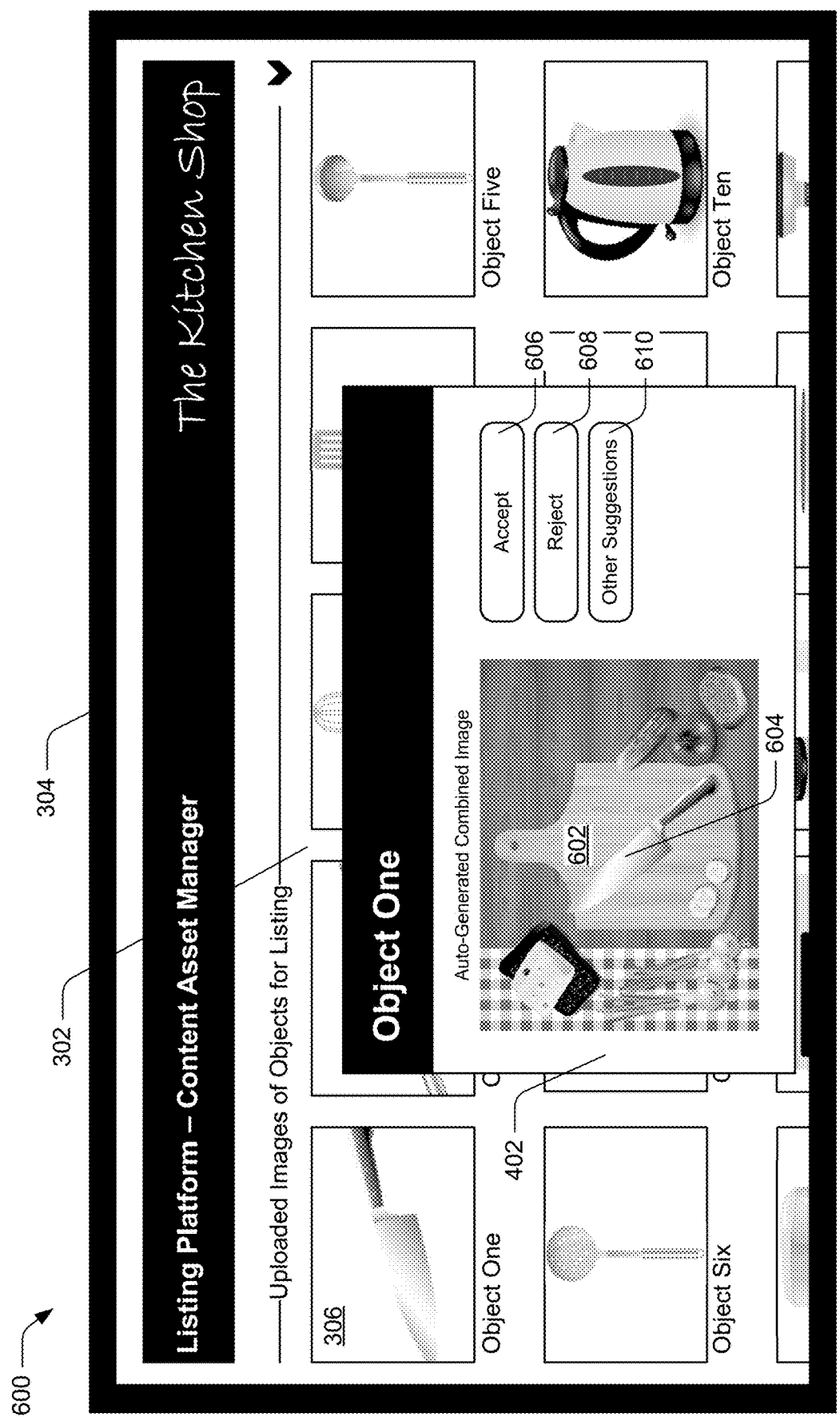
FIG. 6 depicts another example of the user interface in which the background content is combined with the item depicted in the listing content.

FIG. 6 depicts another example 600 of the user interface in which the background content is combined with the item depicted in the listing content.

In this example 600, combined image 602 is presented, e.g., via the listing information dialog 402. The combined image 602 is an example of the combined content 118. In accordance with the described techniques, the combining module 124 generates the combined image 602 by extracting the item 604 from the listed-item image 306 and incorporating the extracted item 604 with the suggested background image 404. The combining module 124 may carry out various operations to perform this combination—and result in the combined image 602—without departing from the spirit or scope of the described techniques. In one or more implementations, the combining module 124 incorporates the extracted item 604 with the suggested background image 404 responsive to user selection of an instrumentality, such as the combination instrumentality 406.

Once the combined image 602 is generated, it may be used in a variety of ways. By way of example, the user interface 302 may enable the combined image 602 to be surfaced via a web page of an e-commerce website, surfaced via other types web pages, surfaced via an application, downloaded (e.g., to the computing device 102), simply maintained in the storage 114 of the listing platform system 106 for future use, and so forth.

The illustrated example 600 also includes accept instrumentality 606, reject instrumentality 608, and other-suggestions instrumentality 610. The accept instrumentality 606 may be selectable to keep the combined image 602, such as to surface as part of a listing of the item, replace the listed-item image 306, and so on. The reject instrumentality 608 may be selectable to reject the combined image 602, such as by deleting the combined image 602, to indicate to leave the item listed with the listed-item image 306, and so on. The other-suggestions instrumentality 610 may be selectable to cause presentation of other combined images (e.g., which are a combination of the extracted item 604 and other background content suggestions 204). The user may select to accept or reject such other suggestions via the accept instrumentality 606 and reject instrumentality 608, respectively.

Having discussed example details of the techniques for background content suggestion, consider now some example procedures to illustrate additional aspects of the techniques.

Example Procedures

This section describes example procedures for background content suggestion in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the listing platform system 106 of FIG. 1 that makes use of a tagging module 120 and a background suggestion module 122.

Figure 7A:
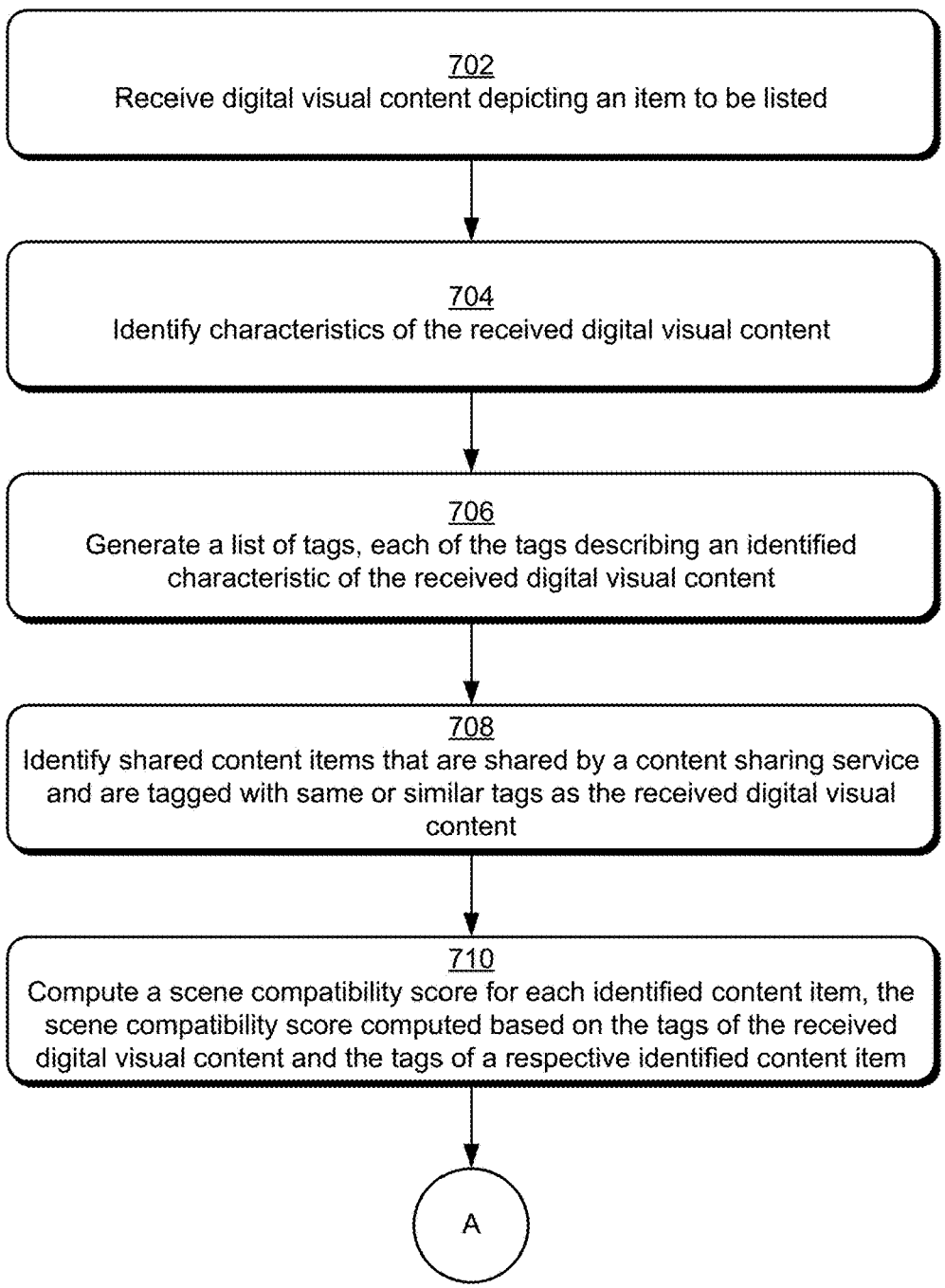
FIGS. 7A and 7B depict a procedure in an example implementation in which a background content item is identified from a plurality of background content items for combination with an item identified in listing content.
Figure 7B:
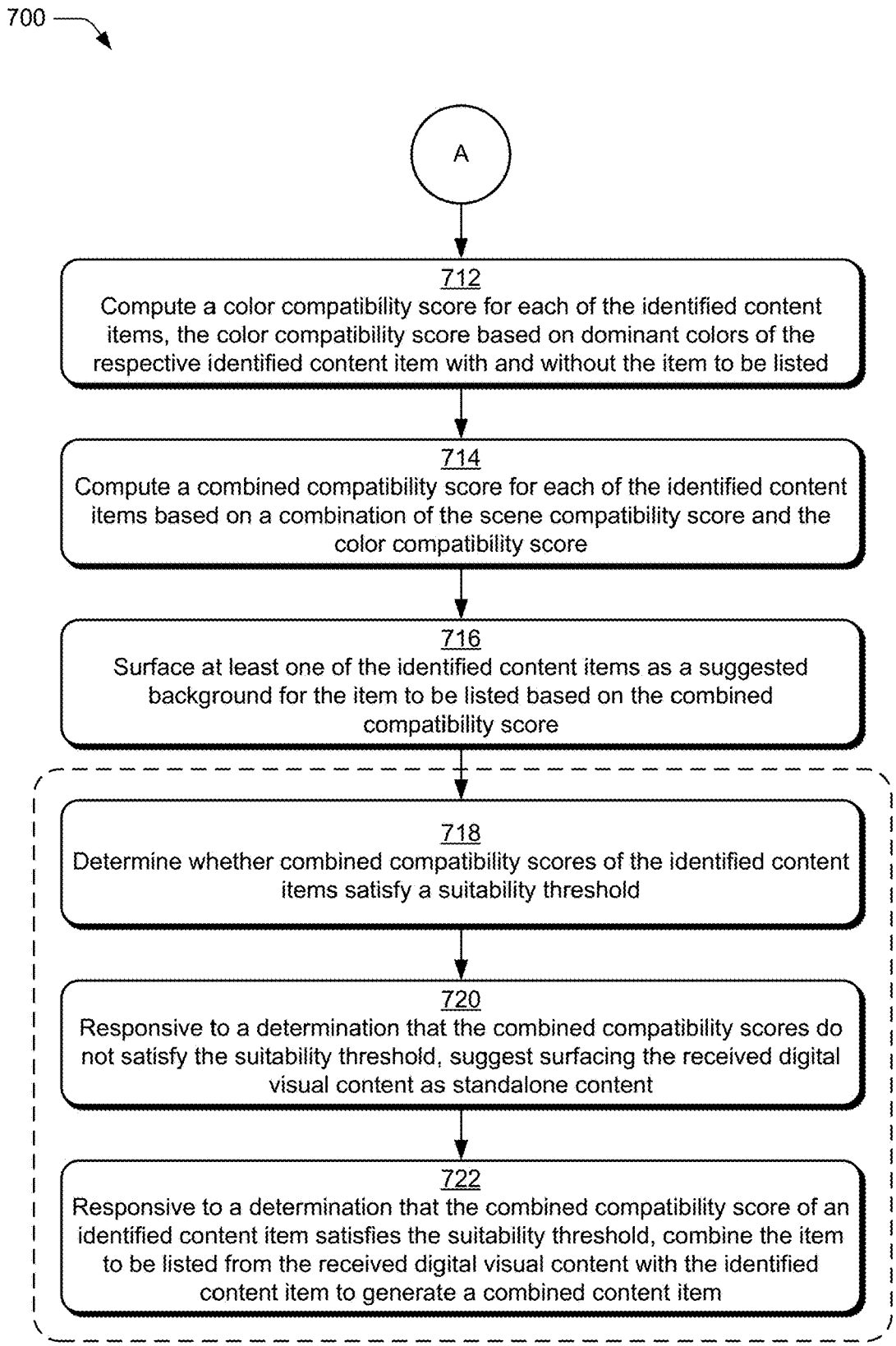

FIGS. 7A and 7B depict a procedure 700 in an example implementation in which a background content item is identified from a plurality of background content items for combination with an item identified from listing content.

Digital visual content depicting an item to be listed is received (block 702). By way of example, the listing platform system 106 receives the listed-item image 306 as an upload from the computing device 102. As noted above, the listed-item image 306 is one example content item of the listed item content 116 and depicts the item 604, e.g., a knife.

Characteristics of the received digital visual content are identified (block 704). By way of example, the tagging module 120 identifies characteristics of the listed-item image 306, such as by using one or more object recognition techniques to identify the item 604. The tagging module 120 also identifies other characteristics as discussed in more detail above.

A list of tags is generated for the received digital visual content (block 706). In accordance with the principles discussed herein, each of the tags describes an identified characteristic of the received digital visual content. By way of example, the tagging module 120 generates a list of tags for the listed-item image 306. Each of the tags in the list describes at least one characteristic of the listed-item image 306 identified at block 704. In one or more implementations, each of the tags is configured as a text string indicative of the at least one characteristic, e.g., 'knife,' 'kitchen utensil,' and so forth.

Shared content items are identified that are tagged with same or similar tags as the received digital visual content (block 708). In accordance with the principles discussed herein, the shared content items are shared by a content sharing service. By way of example, the scene compatibility module 206 identifies content items from the background content 130 that have a list of descriptive tags 132 that are semantically similar or the same as the list of tags generated at block 706.

A scene compatibility score is computed for each identified content item (block 710). In accordance with the principles discussed herein, the scene compatibility score is computed based, at least in part, on the tags of the received digital visual content and the tags of a respective identified content item. By way of example, the scene compatibility module 206 computes the scene compatibility score 212 for each of the shared content items identified at block 708. In particular, the scene compatibility module 206 computes the scene compatibility score 212 based, at least in part, on the list of tags generated at block 706 and the list of the descriptive tags 132 of the respective identified content item. The manner in which the scene compatibility module 206 computes the scene compatibility scores is discussed in more detail above. The procedure 700 continues at 'A' from FIG. 7A to FIG. 7B.

A color compatibility score is computed for each of the identified content items (block 712). In accordance with the principles discussed herein, the color compatibility score is computed based, at least in part, on dominant colors of the respective identified content item with the item to be listed incorporated and dominant colors without the item to be listed incorporated. By way of example, the color compatibility module 208 computes the color compatibility score 214 for each of the shared content items identified at block 708, such as the background image 404. In this particular example, the color compatibility module 208 computes the color compatibility score 214 based on dominant colors of the background image 404 including the item 604 incorporated and dominant colors of the background image 404 itself—without the item 604 being incorporated. The manner in which the color compatibility module 208 computes the color compatibility scores is discussed in more detail above.

A combined compatibility score is computed for each of the identified content items based on a combination of the scene compatibility score and the color compatibility score (block 714). By way of example, the score combining module 210 computes a combined compatibility score for each of the shared content items identified at block 708 by combining the computed scene compatibility score 212 and the color compatibility score 214.

At least one of the identified content items is surfaced as a suggested background for the item to be listed based on the combined compatibility score (block 716). By way of example, the background image 404 is surfaced via the user interface 302 as a suggested background for the item 604 depicted in the listed-item image 306 based on the combined compatibility score computed at block 714.

In one or more implementations, the procedure 700 optionally includes the following blocks 718-722. These blocks may be performed in addition to block 716 or these blocks may be performed as an alternative to block 716. A determination is made regarding whether the combined compatibility scores of the identified content items satisfy a suitability threshold (block 718). By way of example, the background suggestion module 122 determines whether the combined compatibility scores computed at block 714 for the identified content items satisfy the suitability threshold.

Responsive to a determination at block 718 that the combined compatibility scores do not satisfy the suitability threshold, a suggestion is output to surface the received digital visual content as standalone content (block 720). By way of example, the background suggestion module 122 determines at block 718 that the combined compatibility scores computed at block 714 do not satisfy the suitability threshold. Responsive to this determination, the background suggestion module 122 surfaces a suggestion, via the user interface 302 for instance, that the listed-item image 306 be output as standalone content—that it not be combined with any of the background content 130.

Responsive to a determination at block 718 that the combined compatibility score of an identified content item satisfies the suitability threshold, combine the item to be listed from the received digital visual content with the identified content item to generate a combined content item (block 722). By way of example, the background suggestion module 122 determines at block 718 that the combined compatibility score of the background image 404 computed at block 714 satisfies the suitability threshold. Responsive to this determination, the combining module 124 combines the item 604 with the background image 404 to generate the combined image 602. Then, the background suggestion module 122 may cause the combined image 602 to be surfaced, e.g., via the user interface 302.

Figure 8:
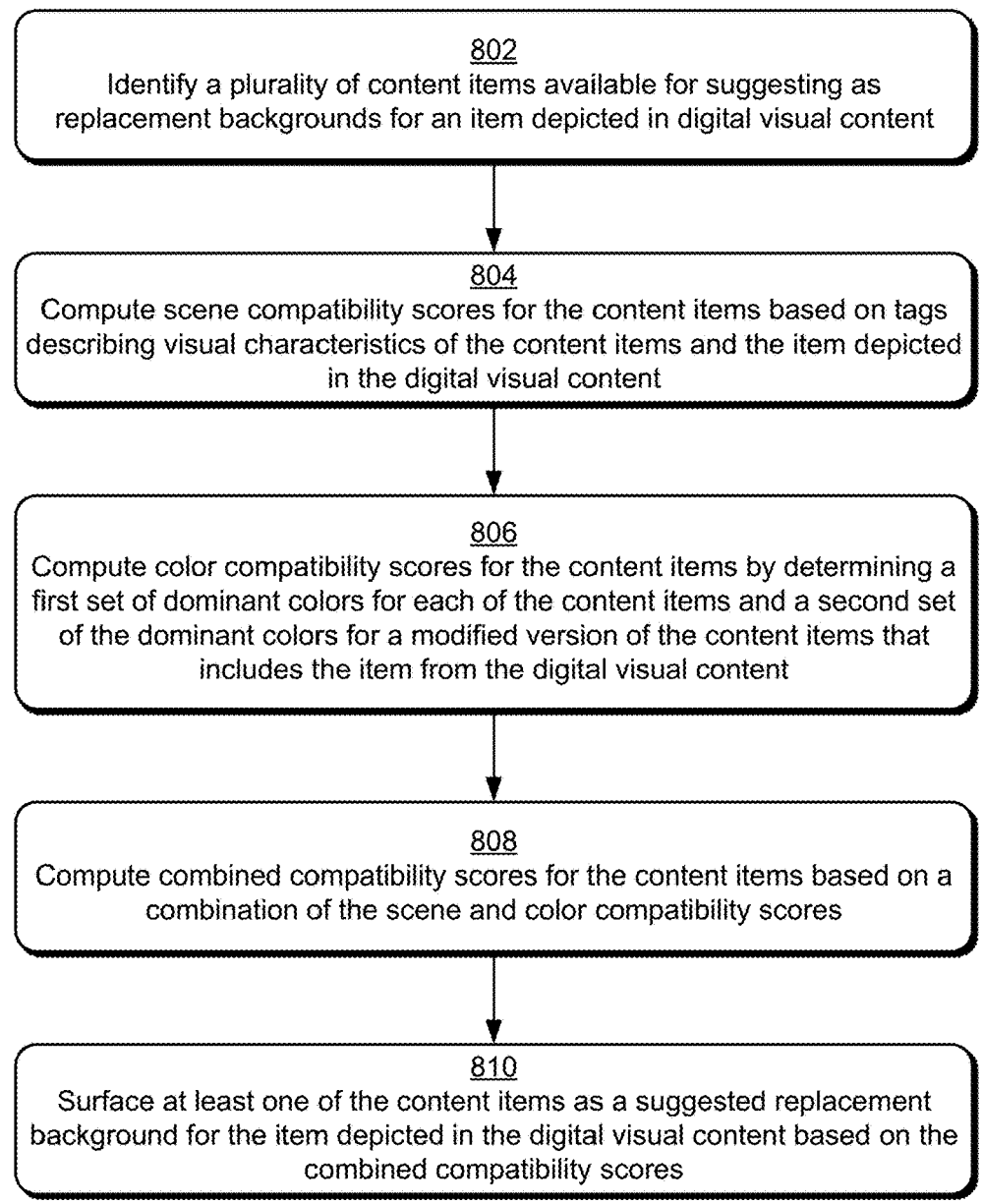
FIG. 8 depicts a procedure in an example implementation in which a content item is suggested as a replacement background for an item depicted in digital visual content.

FIG. 8 depicts a procedure 800 in an example implementation in which a content item is suggested as a replacement background for an item depicted in digital visual content.

A plurality of content items available for suggesting as replacement backgrounds is identified for an item depicted in digital visual content (block 802). By way of example, the background suggestion module 122 identifies the background content 130 as being available suggestions as replacement backgrounds. Scene compatibility scores are computed for the content items based on tags describing visual characteristics of the content items and the item depicted in the digital visual content (block 804). By way of example, the scene compatibility module 206 determines the scene compatibility scores 212 for the background content items 130. Color compatibility scores are computed for the content items by determining a first set of dominant colors for each of the content items and a second set of the dominant colors for a modified version of the content items that includes the item from the digital visual content (block 806). By way of example, the color compatibility module 208 determines the color compatibility scores 214 for the background content items 130.

Combined compatibility scores are computed for the content items based on a combination of the scene and color compatibility scores (808). By way of example, the score combining module computes the combined compatibility scores based on a combination of the scene and color compatibility scores, 212, 214, respectively. At least one of the content items is surfaced as a suggested replacement background for the item depicted in the digital visual content based on the combined compatibility scores. By way of example, the background suggestion module 122 surfaces at least one of the background content suggestions 204 based on the combined compatibility scores.

Having described example procedures in accordance with one or more implementations, consider now an example system and device that can be utilized to implement the various techniques described herein.

Example System and Device

Figure 9:
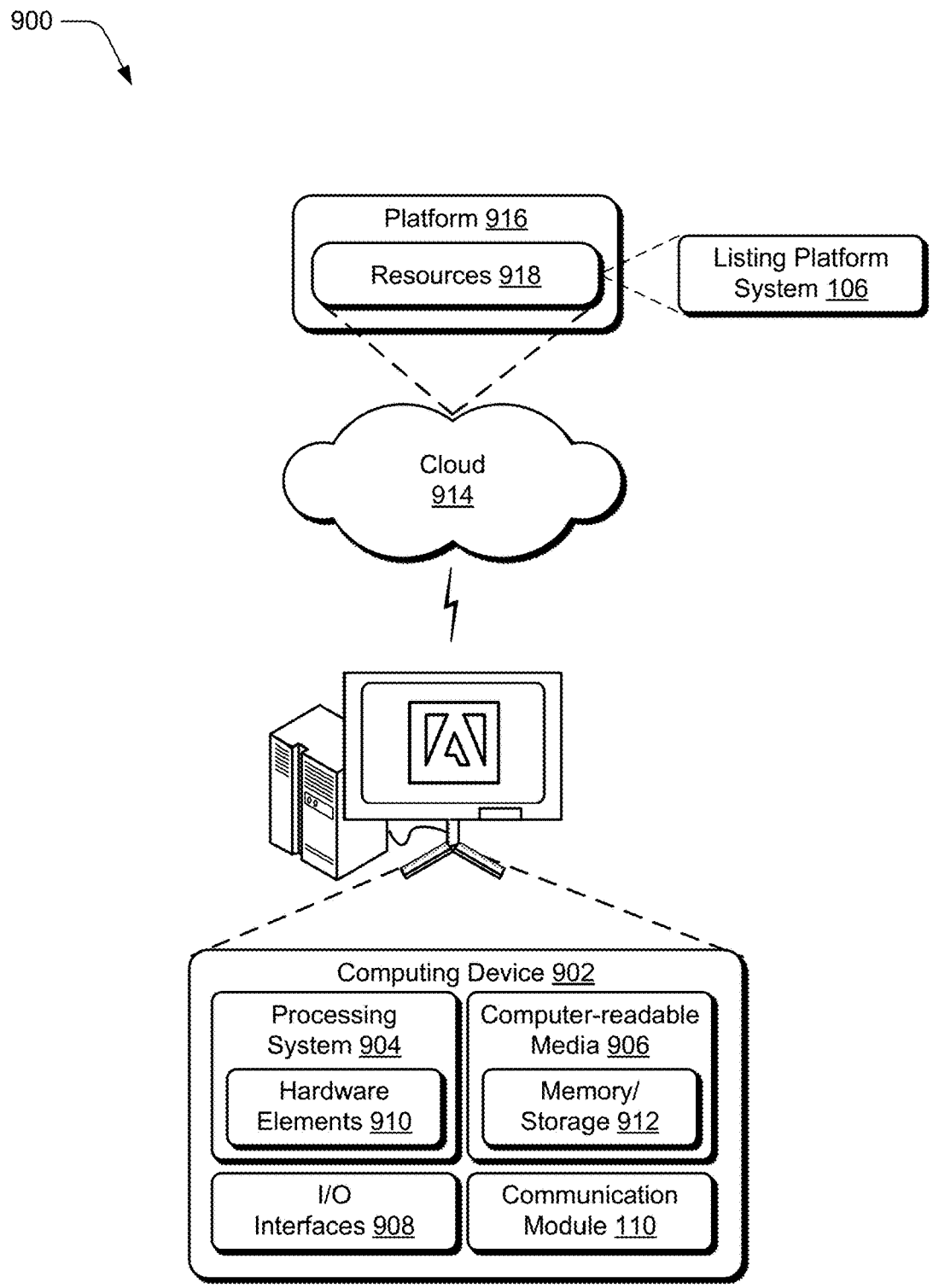
FIG. 9 illustrates an example system including various components of an example device that can be implemented as any type of computing device as described and/or utilized with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the communication module 110 and the listing platform system 106. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to suggest replacement background content for an item depicted in digital visual content, a method implemented by at least one computing device, the method comprising:
   identifying a plurality of content items available for suggesting as replacement backgrounds for an item depicted in digital visual content;
   computing scene compatibility scores for the content items based on tags describing visual characteristics of the content items and tags describing the visual characteristics of the item depicted in the digital visual content;
   determining a first set of dominant colors for each of the content items;
   determining a second set of dominant colors for each of the content items based on a modified version of a respective content item that incorporates the item from the digital visual content;
   computing color compatibility scores for the content items based on the first and second sets of dominant colors;
   computing combined compatibility scores for the content items based on a combination of the scene compatibility scores and the color compatibility scores; and
   surfacing at least one of the content items as a suggested replacement background for the item depicted in the digital visual content based on the combined compatibility scores.

2. A method as described in claim 1, further comprising combining the item depicted in the digital visual content with the at least one content item to generate a combined content item, in part, by extracting the item from the digital visual content.

3. A method as described in claim 2, further comprising including the combined content item as part of a listing surfaced to users of a listing platform.

4. A method as described in claim 3, wherein the listing lists the item for at least one of purchase, rent, download, or further propagation.

5. A method as described in claim 1, further comprising receiving the digital visual content depicting the item as an upload.

6. A method as described in claim 1, further comprising:
   identifying the visual characteristics of the item depicted in the digital visual content; and
   generating a list of the tags for the item depicted in the digital visual content, wherein each of the tags corresponds to at least one of the visual characteristics.

7. A method as described in claim 1, wherein the plurality content items comprise shared content available from a content sharing service.

8. A method as described in claim 7, wherein the content sharing service is a stock content service and the shared content is stock content available for use for a licensing fee.

9. A method as described in claim 1, wherein the scene compatibility score for a given content item is based on coexistence of the tags describing the characteristics of the given content item and the tags describing the visual characteristics of the item depicted in the digital visual content in lists of the tags corresponding to the plurality of content items.

10. A method as described in claim 1, wherein the plurality of content items are identified based, in part, on similarity with in-use digital content having a conversion or conversion rate that satisfies a threshold indicative of suitable conversion.

11. A method as described in claim 1, further comprising determining weights associated with the tags used for computing the scene compatibility scores, a weight for a given tag determined based, in part, on an amount the given tag is included in lists of tags that correspond to available content items which are similar to in-use digital content having a conversion or conversion rate that satisfies a threshold indicative of suitable conversion.

12. A method as described in claim 1, wherein determining the second set of dominant colors further comprises:
   extracting the item from the digital visual content; and
   incorporating the item from the digital visual content to form the modified version of the respective content item.

13. A method as described in claim 1, wherein computing the color compatibility scores includes determining a difference between the first and second sets of dominant colors.

14. A method as described in claim 13, wherein a lesser difference between the first and second sets of dominant colors is indicative of higher compatibility than a larger difference.

15. A system to suggest replacement background content for an item depicted in digital visual content, the system comprising:
   a scene compatibility module implemented at least partially in hardware of at least one computing device to compute scene compatibility scores for a plurality of content items in relation to an item depicted in digital visual content, the scene compatibility scores computed based on tags describing visual characteristics of the content items and the item depicted in the digital visual content;
   a color compatibility module implemented at least partially in the hardware of the at least one computing device to compute color compatibility scores for the content items by:
      determining a first set of dominant colors for each of the content items;
      determining a second set of dominant colors for each of the content items based on a modified version of a respective content item that incorporates the item from the digital visual content; and
      determining the color compatibility scores for the content items based on the first and second sets of dominant colors;
   a background suggestion module implemented at least partially in the hardware of the at least one computing device to surface at least one of the content items as a suggested replacement background for the item depicted in the digital visual content based on the scene and color compatibility scores.

16. A system as described in claim 15, further comprising a tagging module to identify the visual characteristics of the respective content item and generate a list of the tags for the respective content item describing its visual characteristics.

17. A system as described in claim 15, further comprising a score combining module to generate combined scores by combining the scene and color compatibility scores according to a function, the at least one content item surfaced as the suggested replacement background based on the combined scores.

18. A system as described in claim 17, wherein the at least one content item includes a highest scoring content item according to the combined scores computed for the plurality of content items.

19. In a digital medium environment to suggest replacement backgrounds for an item depicted in an image, a method implemented by at least one computing device, the method comprising:
   identifying similar stock images to digital content used in listings determined to be causing conversion at a suitable rate;
   determining a compatibility of the stock images with an item depicted in a listing image based on both scene compatibility and color compatibility, the color compatibility determined by:
      determining a first set of dominant colors for each of the stock images;
      determining a second set of dominant colors for each of the stock images based on a modified version of a respective stock image that incorporates the item depicted in the listing image; and
      computing color compatibility scores for the stock images based on the first and second sets of dominant colors;
   surfacing a stock image, having a highest compatibility, as a suggested replacement background for the item depicted in the listing image.

20. A method as described in claim 19, further comprising generating a new listing image for the item by:
   extracting the item from the listing image; and
   incorporating the item into the stock image.

* * * * *